United States Patent
Cadio

(10) Patent No.: US 10,270,070 B2
(45) Date of Patent: Apr. 23, 2019

(54) INTUITIVE AND SPACE SAVING BATTERY RETENTION CONCEPT PROVIDING A DOUBLE RETENTION OF THE BATTERIES

(71) Applicant: Roche Diabetes Care, Inc., Indianapolis, IN (US)

(72) Inventor: Michel Alain Jean Marie Cadio, Carmel, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 191 days.

(21) Appl. No.: 15/164,769

(22) Filed: May 25, 2016

(65) Prior Publication Data

US 2017/0346051 A1 Nov. 30, 2017

(51) Int. Cl.
  *B23P 19/00* (2006.01)
  *H01M 2/10* (2006.01)

(52) U.S. Cl.
  CPC ...... *H01M 2/1044* (2013.01); *H01M 2220/30* (2013.01); *Y10T 29/53174* (2015.01)

(58) Field of Classification Search
  CPC .. H01M 2/04; H01M 2/1022; Y10T 29/53174
  USPC ......... 29/739, 758, 764, 795, 825, 874, 876, 29/717, 718
  See application file for complete search history.

(56) References Cited

U.S. PATENT DOCUMENTS

| | | |
|---|---|---|
| 5,149,604 A | 9/1992 | Nakanishi |
| 5,876,241 A | 3/1999 | Frantz |
| 5,980,309 A | 11/1999 | Frantz et al. |
| 6,124,056 A | 9/2000 | Kimura |
| 9,263,716 B2 * | 2/2016 | Szoke ................. H01M 2/1044 |
| 9,520,582 B2 * | 12/2016 | Kawabata ................. F21L 4/00 |
| 2005/0277326 A1 | 12/2005 | Chung |
| 2011/0262790 A1 | 10/2011 | Zhu |
| 2012/0057277 A1 | 3/2012 | Shen |
| 2012/0087096 A1 * | 4/2012 | Shen .................. G07C 9/00944 361/760 |
| 2014/0043737 A1 | 2/2014 | Chen et al. |
| 2014/0232348 A1 | 8/2014 | Szoke et al. |
| 2014/0286001 A1 | 9/2014 | Kawabata et al. |
| 2014/0363716 A1 | 12/2014 | Nishida et al. |
| 2015/0118534 A1 | 4/2015 | Rolfs et al. |

OTHER PUBLICATIONS

International Patent Application PCT/2017/034232 International Search Report and Written Opinion dated Aug. 1, 2017. 9 pages.

* cited by examiner

*Primary Examiner* — Thiem D Phan
(74) *Attorney, Agent, or Firm* — Woodard, Emhardt, Henry, Reeves & Wagner, LLP

(57) ABSTRACT

A battery retention system is configured to facilitate insertion and removal of batteries from an electronic device. The electronic device includes a housing that defines a battery cavity for receiving a battery. The battery cavity has a floor. A floor contact extends from the floor. The floor contact is configured to provide a biasing force to push the battery away from the floor of the battery cavity. The housing has tabs extending into the battery cavity to hold the battery in the battery cavity against the biasing force of the floor contact. The battery cavity has a recess that allows the battery to move in a lateral direction along the floor to a position where the battery disengages from at least one of the tabs to allow at least a portion of the battery to be pushed out of the battery cavity by the biasing force of the floor contact.

26 Claims, 7 Drawing Sheets

INTUITIVE AND SPACE SAVING BATTERY RETENTION CONCEPT PROVIDING A DOUBLE RETENTION OF THE BATTERIES

BACKGROUND

With the advent of microelectronics, electronic devices have become progressively smaller and more powerful over time. For example, glucose meters have been developed that now allow patients and other individuals to monitor blood glucose levels in the privacy of their own home. Such devices are typically powered by relatively small coin cell type batteries. Other devices, such as hearing aids, require even smaller button cell batteries that are very difficult to handle. Users of these devices may experience hand-eye coordination difficulties and other dexterity issues, due to medical conditions or simply age, that make replacement of the batteries a very difficult process. For example, common battery compartment designs require the battery door to hold the batteries in place. When a battery is inserted into the battery compartment, the battery is pressed against a battery contact spring that creates an electrical circuit for powering the electronic device. The battery contact spring is biased to push the battery out of the compartment. When closed, the battery door is used to resist the biasing force applied by the battery contact springs to hold the batteries within the battery compartment. With such a design, the batteries have a tendency to pop out of the battery compartment which in turn can make battery replacement a very difficult and frustrating task. The battery door also needs a sufficient thickness so as to resist the biasing force from the battery contact spring that is pushing the battery out of the battery compartment. If it is too thin, the battery door can undesirably deform over the life of the device. In addition, the battery contact spring also needs to be oversized in order to adequately contact the battery over the life of the device. These design considerations unnecessarily increase the size and weight of the electronic device. Thus, there is a need for improvement in this field.

SUMMARY

So as to make battery replacement intuitive for an individual as well as to reduce the profile of the electronic device, a unique battery retention system and method for inserting, retaining, and removing batteries from the electronic device has been developed. The system and method also allow the retention of a battery by avoiding deformation of the door when the thickness of the battery door has been reduced to keep the electronic device thin. Specifically, the battery retention system includes a positive battery contact that is biased to press the battery in a radially inward direction within the battery compartment and a negative battery contact that is biased to push the battery in a normal direction that is out of the battery compartment. The system further includes a positive contact protective tab that is positioned over the positive contact and a locking tab that is generally positioned opposite the positive contact protective tab. One example of the meter includes two battery compartments with a recess in between in which the batteries can move. The battery door includes a door tab that keeps the battery separated and retained under the locking tab when the door is closed. The battery door further includes cutouts to leave room for the locking tab and the positive contact protective tab. The system is designed to either retain one battery within the compartment or retain multiple batteries within the same compartment in a stacked manner if needed.

To insert the battery, the edge of the battery is slid under the positive contact protective tab and then pushed down toward the locking tab until it reaches the outer side of the compartment. Once pressure is released, the battery is retained under the locking tab. The force from the positive contact pushes the battery under the locking tab, thereby retaining the battery in place. The tab on the battery door keeps the battery separated during normal usage so as to retain the battery under the locking tab. To remove the battery, the battery is moved towards the center of both compartments so that the edge of the battery is clear of the locking tab. By being biased out of the compartment, the negative contact then pushes the battery out of the compartment.

As should be recognized, this system facilitates a very thin stack of components and avoids deformation of the battery door by removing any forces of the negative battery contact spring pushing against the battery door. Moreover, the size of the battery contact can be reduced because both the positive battery contact and negative battery contact are minimally deformed during insertion and retention. In other words, the battery contacts do not require additional deformation for removal of the battery. Instead, the sliding action facilitates removal of the battery. In addition, the recess between the two battery components reduces the space required because both battery compartments share a common removal space. As should be appreciated, having both the lock tab and the tab on the door provides a redundant means for retaining the battery.

Aspect 1 concerns a system, comprising a housing defining a battery cavity configured to receive a battery, the battery cavity having a floor a floor contact extending from the floor, wherein the floor contact is configured to provide a biasing force to push the battery away from the floor of the battery cavity the housing having one or more tabs extending into the battery cavity to hold the battery in the battery cavity against the biasing force of the floor contact; and the battery cavity having a recess that allows the battery to move in a lateral direction along the floor to a position where the battery disengages from at least one of the tabs to allow at least a portion of the battery to be pushed out of the battery cavity by the biasing force of the floor contact.

Aspect 2 concerns the system of any preceding aspect, further comprising a wall contact positioned in the battery cavity to bias the battery to engage the at least one of the tabs.

Aspect 3 concerns the system of any preceding aspect, wherein the tabs include a contact protective tab positioned to protect the wall contact, and a locking tab positioned along a side of the battery cavity with the floor contact located between the contact protective tab and the locking tab; and the wall contact is configured to bias the battery to engage the locking tab.

Aspect 4 concerns the system of any preceding aspect, wherein the floor contact includes a contact portion where the floor contact contacts the battery the locking tab is located offset from the contact protective tab; and the locking tab is aligned with the contact portion to counteract the biasing force from the floor contact.

Aspect 5 concerns the system of any preceding aspect, wherein the locking tab has a beveled exterior surface to guide the battery into the battery cavity.

Aspect 6 concerns the system of any preceding aspect, further comprising a battery door enclosing the battery cavity; the battery door defining a contact protective tab cavity in which the contact protective tab is received and a locking tab cavity in which the locking tab is received.

Aspect 7 concerns the system of any preceding aspect, further comprising a battery door configured to cover the battery cavity when in a closed position; and wherein the tabs are configured to retain the battery in the battery cavity without the battery door needing to be in the closed position.

Aspect 8 concerns the system of any preceding aspect, wherein the battery door includes a door tab extending into the recess to reduce lateral movement of the battery within the battery cavity.

Aspect 9 concerns the system of any preceding aspect, wherein the battery door includes one or more cavities to configured receive the tabs.

Aspect 10 concerns the system of any preceding aspect, wherein the floor contact a contact portion that is angled away from the recess facilitate lateral movement of the batter away from the recess during insertion of the battery into the battery cavity.

Aspect 11 concerns the system of any preceding aspect, wherein the housing defines a second battery cavity configured to receive a second battery; and the battery cavity and the second battery cavity overlap to share the recess.

Aspect 12 concerns the system of any preceding aspect, further comprising wherein the housing defines a battery compartment that includes the battery cavity and the second battery cavity; and a battery door configured to enclose the battery compartment, the battery door having a door tab positioned to extend into the recess between the battery compartment and the second battery compartment when closed.

Aspect 13 concerns the system of any preceding aspect, further comprising the battery received in the battery cavity; and a second battery stack on the battery in the battery cavity.

Aspect 14 concerns a method, comprising pushing a battery against a biasing force of a contact in a battery compartment retaining the battery in the battery compartment with one or more tabs that counteract the biasing force of the contact; and removing the battery from the battery compartment by moving the battery in a lateral direction to a position where the battery disengages from at least one of the tabs.

Aspect 15 concerns the method of any preceding aspect, wherein the tabs include a contact protective tab positioned to protect a wall contact; and a locking tab positioned opposite the contact protective tab in the battery compartment.

Aspect 16 concerns the method of any preceding aspect, wherein said pushing includes:
  inserting an edge of the battery to engage the contact protective tab; and guiding the battery into the battery compartment with a beveled exterior surface of the locking tab.

Aspect 17 concerns the method of any preceding aspect, wherein said retaining includes sliding the battery in a lateral direction towards the locking tab to engage the locking tab.

Aspect 18 concerns the method of any preceding aspect, wherein said retaining includes applying a lateral biasing force with the wall contact spring to cause the battery to slide in the lateral direction to engage the locking tab.

Aspect 19 concerns the method of any preceding aspect, further comprising closing the battery compartment with a battery door; wherein the battery door includes a contact protective tab cavity and a locking tab cavity; and wherein said closing includes receiving the contact protective tab into the contact protective tab cavity and the locking tab into the locking tab cavity.

Aspect 20 concerns the method of any preceding aspect, further comprising closing the battery compartment with a battery door; and wherein said retaining occurs before said closing.

Aspect 21 concerns the method of any preceding aspect, wherein said removing includes sliding a portion of the battery into a recess of the battery compartment; and said closing includes inserting a door tab of the battery door into the recess to reduce lateral movement of the battery within the battery compartment.

Aspect 22 concerns the method of any preceding aspect, wherein the battery compartment includes two or more battery cavities that intersect at the recess; and said inserting includes inserting the door tab into the recess between the battery cavities.

Aspect 23 concerns the method of any preceding aspect, further comprising wherein the battery compartment includes a battery cavity wherein the battery cavity includes a floor, and a wall located around the floor to define the battery cavity wherein the contact includes a floor contact extending from the floor wherein the battery compartment includes a wall contact extending from the wall, a contact protective tab covering the wall tab, and a locking tab biasing the battery with the wall contact to move the battery into engagement with the locking tab after said pushing; and wherein said removing includes pushing the battery out of the battery cavity with the floor contact.

Aspect 24 concerns the method of any preceding aspect, wherein the floor contact includes a contact portion where the floor contact contacts the battery the locking tab is located offset from the contact protective tab; and the locking tab is aligned with the contact portion to counteract the biasing force from the floor contact.

Aspect 25 concerns the method of any preceding aspect, further comprising stacking the battery on a second battery in the battery compartment before or during said pushing.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
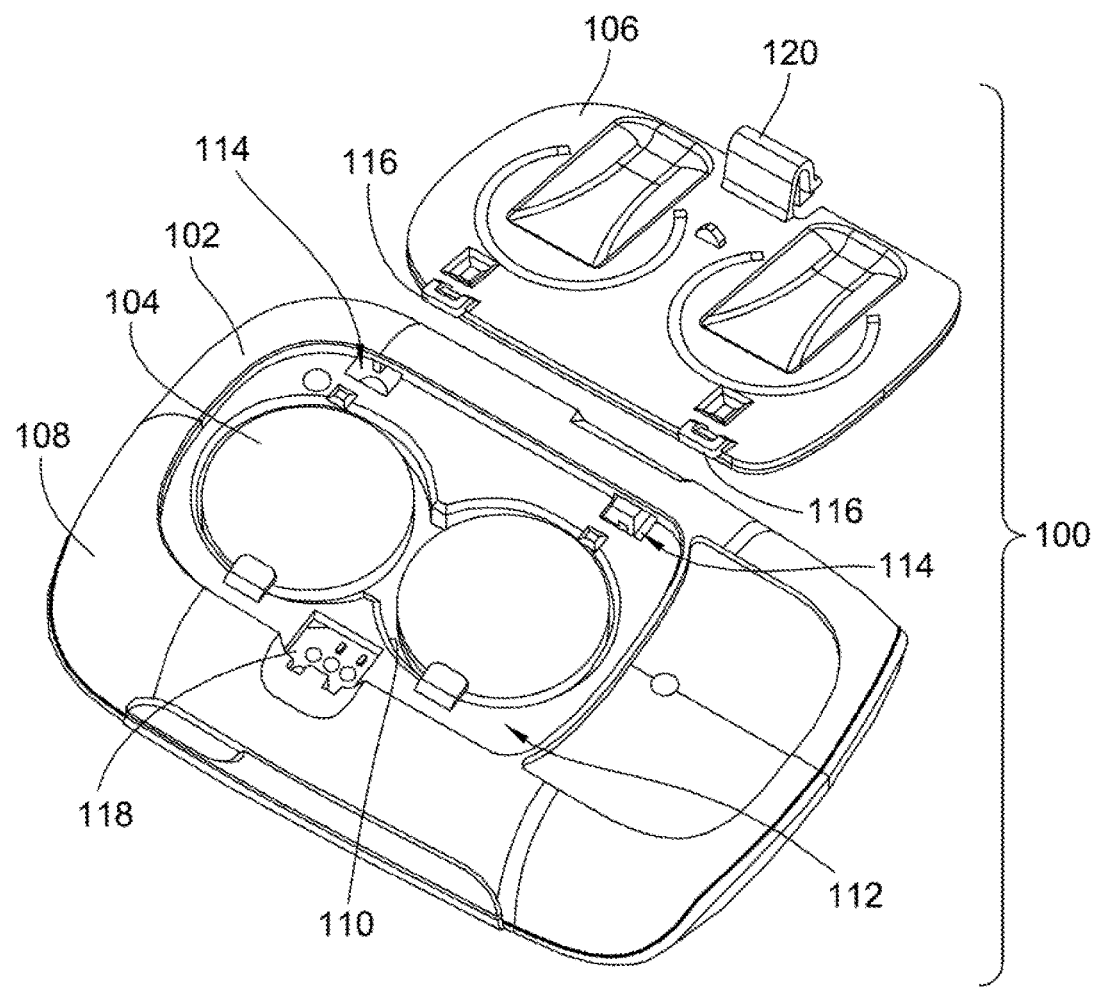
FIG. 1 is an exploded view of a battery retention system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on.

FIG. 1 shows an exploded view of one example of a battery retention system 100 for an electronic device 102. In the illustrated example, the electronic device 102 is a glucose meter, but the battery retention system 100 can be incorporated into other types of electronic or electrical type devices. The battery retention system 100 provides an intuitive as well as secure means for retaining one or more batteries 104 within the electronic device 102. In the illustrated example, the batteries 104 are in the form of coin cell type batteries, but it should be recognized that the battery retention system 100 can be used for other types of batteries, such as button cell batteries.

As depicted, a battery door 106 is used to enclose the batteries 104 within the electronic device 102. The electronic device 102 has a housing 108 that forms the exterior of the electronic device 102. The housing 108 defines a battery compartment 110 in which the batteries 104 are received. Surrounding the battery compartment 110, the housing 108 defines a battery door cavity 112 configured to receive the battery door 106 so that battery door 106 is flush with the exterior of the rest of the electronic device 102. Inside the door cavity 112, the housing 108 has one or more hinge cavities 114 that are configured to receive corresponding one or more hinge tabs 116 on the battery door 106. The housing 108 further includes a latch opening 118 configured to receive insecure or a door latch 120 on the battery door 106. To secure the battery door 106 to the electronic device 102, the hinge tabs 116 are inserted into the hinge cavities 114. The battery door 106 is then pivoted about the hinge tabs 116 until the door latch 120 locks or latches to the latch opening 118 in the electronic device 102. It should be appreciated that the battery door 106 can be secured to the electronic device 102 in other manners as would occur to those skilled in the art. In the illustrated example, the battery door 106 and the housing 108 are made of plastic, but it should be appreciated that these components can be made from other materials, such as other electrically insulative materials.

Figure 2:
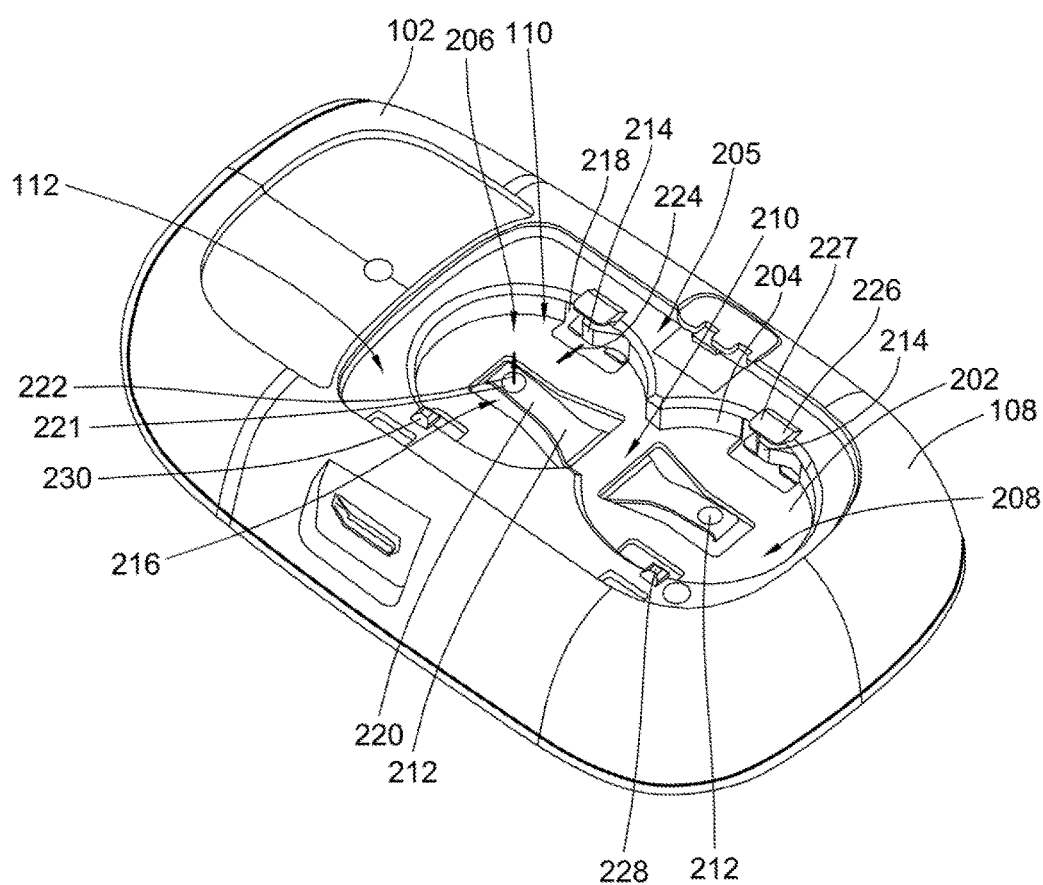
FIG. 2 is a perspective view of an electronic device used in the FIG. 1 battery retention system with the batteries removed.

FIG. 2 illustrates the electronic device 102 with the batteries 104 removed from the battery compartment 110 so that the various components of the battery compartment 110 can be better viewed. The battery compartment 110 includes a battery compartment floor 202 and a battery compartment wall 204 surrounding the floor 202 that defines the general shape of the battery compartment 110. In the illustrated example, the battery compartment 110 includes two battery cavities 205, a first battery cavity 206 and a second battery cavity 208, that are each configured to receive one or more of the batteries 104. In the illustrated example, the battery cavities 205 are each configured to receive a single battery 104. Both the first 206 and second 208 battery cavities have a generally cylindrical shape so as to coincide with the shape of the batteries 104. However, the cylindrical shapes of these cavities 205 are truncated where the first 206 and second 208 cavities overlap one another to form a recess or gap 210. By overlapping, the walls 204 of the battery cavities 205 give the battery compartment 110 an overall shape that is similar to the outline of the Arabic numeral eight (i.e., "8"). The battery cavities 205 are sized larger than the batteries 104 so as to facilitate lateral sliding movement of the batteries 104 inside the battery compartment 110. In other words, the battery cavities 205 have larger diameters as compared to that of the batteries 104 in the illustrated example. Although the battery compartment 110 in the illustrated example includes two battery cavities 205, the battery compartment 110 in other examples can include a single battery cavity 205 or more than two battery cavities 205.

At the floor 202, the battery compartment 110 has a floor contact spring 212 (or "floor contact" for short) in each cavity 205, and each battery cavity 205 further has a wall contact spring 214 (or wall contact) along the walls 204. In each battery cavity, the floor 202 and the walls 204 respectively have a floor contact opening 216 for the floor contact spring 212 and a wall contact opening 218 for the wall contact spring 214. In the illustrated example, the contact springs 212, 214 are generally in the form of leaf type springs, but the contact springs 212, 214 can have other forms in other examples, such as in the form of a coil type spring electrical contact. The contact springs 212, 214 are typically attached to an underlying circuit board 220. As depicted, the floor contact springs 212 are angled away from the recess 210 so as to facilitate the lateral motion of the batteries 104 away from the recess 210 during installation. Such a configuration helps to increase the chances of proper contact between the batteries 104 and the floor contact springs 212 as well as reduces the risk of damage to the floor contact springs 212 during installation of the batteries 104. The contact openings 216, 218 provide access to the battery compartment 110 so as to make an electrical connection with the batteries 104. At or near the free end that is opposite to the end where the floor contact spring 212 is attached to the circuit board 220, the floor contact spring 212 has a contact portion or dome 221 configured to create an electrical contact with the battery 104. The contacts springs 212, 214 are made from electrically conductive material in order to supply the electrical power from the batteries 104 to the electronic device 102. In one form, the contacts springs 212, 214 are made of metal, but in other examples, the contacts springs 212, 214 can be made from other electrically conductive material. In one form, the floor contact spring 212 is a negative contact, and the wall contact spring 214 acts as a positive contact. It nevertheless should be recognized that the contacts springs 212, 214 can have different polarities in other examples. As indicated by arrow 222, the floor contact spring 212 is biased to provide a force in a direction that is generally perpendicular or transverse to the floor 202. On the other hand, the wall contact spring 214 is biased to provide a force that is parallel to the floor 202 or transverse to the wall 204 as depicted by arrow 224. When one of the batteries 104 is inserted into one of the battery cavities 205, the floor contact spring 212 is biased to push the battery 104 out of the cavity 205, and the wall contact spring 214 is biased to push on the battery 104 in an inner radial direction. In the illustrated example, the biasing force vectors 222, 224 of the contact springs 212, 214 are positioned offset from one another such that the biasing force of the wall contact spring 214 creates a torque that causes the battery to generally pivot or rotate about the contact portion 221 of the floor contact spring 212. This resulting torque naturally biases the battery 104 to clip underneath or engage the locking tab 228 and remain there.

Around each battery cavity 205, the housing 108 of the electronic device 102 has a contact protective tab 226 with an exterior surface 227 that is positioned to cover and protect the wall contact spring 214. The exterior surface 227 of the contact protective tab 226 is generally beveled to help direct the battery 104 into the battery cavity 205 during installation. At a side generally opposite the contact protective tab 226, the housing 108 further includes a locking tab 228. The contact protective tab 226 is generally positioned at a location that splits the cavity 205 in half. The locking tab 228 is generally offset from this axis away from the recess 210. As shown, the locking tab 228 has a rounded or beveled exterior surface 230 that aids in the insertion of the batteries 104 into the battery cavities 205. Both the contact protective tab 226 and the locking tab 228 are designed to extend within the battery compartment 110 so as to retain the battery 104 against the biasing force of the floor contact spring 212 (as is indicated by arrow 222). In the illustrated example, each battery cavity 205 has two tabs 226, 228, but in other examples, the battery cavity 205 can have more or less than two tabs and/or be oriented/shaped differently than shown. For example, another structure, such as a lip around the battery cavity 205, can replace the contact protective tab 226 such that each cavity has a single, locking tab 228. In another example, each battery cavity 205 includes two locking tabs 228 along with the contact protective tab 226. In this example, the second locking tab 228 is positioned generally opposite of the recess 210 in order to add strength and provide greater stability for the battery 104, and during removal, the battery 104 disengages from both locking tabs 228. As will be explained in greater detail below, both tabs 226, 228 relieve any force by the floor contact spring 212 against the battery door 106. As a result, the door 106 can be made thinner and sleeker because it does not have to resist the force applied by the floor contact spring 212.

Figure 3:
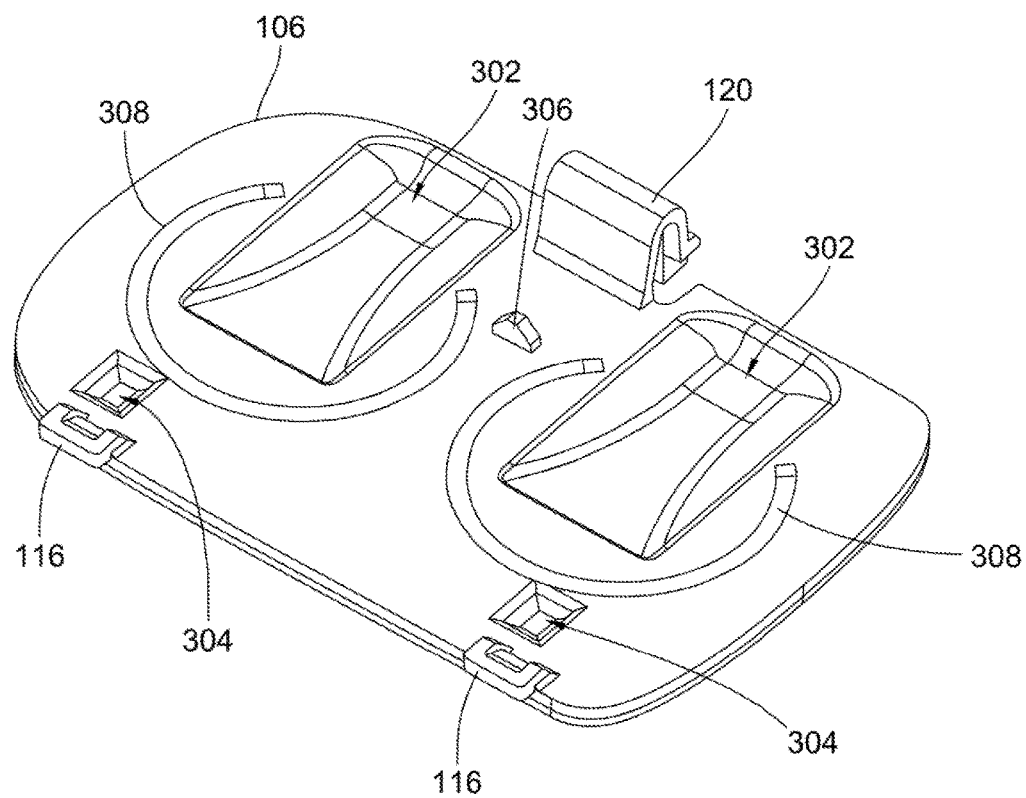
FIG. 3 is a perspective view of a door used to close a battery compartment in the FIG. 2 electronic device.

Turning to FIG. 3, the door 106 has one or more contact protective tab relief cavities 302 in which the contact protective tabs 226 are received when the door 106 is closed (i.e., secured to the electronic device 102). In addition, the door 106 has one or more locking tab relief cavities 304 that are positioned and configured to receive the locking tabs 228 when the door 106 is closed on the electronic device 102. Between the contact protective tab relief cavities 302, the door 106 has a door tab 306 that is positioned to extend within the recess 210 between the battery cavities 205 (FIG. 2). As will be explained in greater detail below, the door tab 306 prevents the batteries 104 from moving within the battery cavities 205 when the door 106 is closed. This in turn prevents the batteries 104 from disengaging from the locking tabs 228 such that the batteries 104 are retained within the battery compartment 110. As shown, the battery door 106 further includes battery biasing edges 308 that generally coincide in shape with the batteries so as to position the batteries 104 within the battery cavities 205. It should be appreciated that other types of battery doors 106 can be configured for use with this battery retention system 100. For example, instead of being removable, the battery door 106 can be permanently or semi-permanently attached to the electronic device 102. In one form, living hinges permanently attached the battery door 106 to the electronic device 102 instead of through the hinge tabs 116. It is also envisioned that the battery door 106 can be secured to the electronic device 102 in other manners besides through the door latch 120 and/or with other configurations. For instance, two opposing door latches 120 can be positioned on opposite sides of the door 106 so as to secure the door 106 to the electronic device 102. Alternatively or additionally, other enclosure devices or structures besides battery doors can be used to provide similar functions. It is contemplated that the battery retention system 100 in other examples does not include the battery door 106, but instead, includes some other structure. For instance, part of the cover for display of the electronic device 102 could include the door tab 306.

The battery retention system 100 is designed to simplify installation and removal of batteries 104. Generally speaking, only simple, intuitive movements are required in order to install and remove the batteries. That is, a push down motion is used to install the battery 104, and a sliding lateral motion is used to remove the battery 104. During installation, an edge of the battery 104 is hooked under the contact protective tab 226. The battery 104 is then pushed towards the battery compartment floor 202 against the biasing force of the floor contact spring 212. During the pushing motion, the rounded exterior surface 230 of the locking tab 228 causes the battery 104 to slightly rotate towards the recess 210. This slight rotational force compresses the wall contact spring 214. Once the battery 104 is pushed flat against the floor 202 of the battery compartment 110, the lateral biasing force created by prior compression of the wall contact spring 214 along with the rounded shape of the battery compartment wall 204 causes the battery 104 to naturally rotate and settle into a position in which the battery 104 is hooked underneath the locking tab 228. To remove the battery 104, a lateral, sliding motion of the battery 104 is used to push the battery 104 towards the recess 210. Once the edge of the battery 104 is unhooked from the locking tab 228 and the finger pressure of the user is reduced or released, the biasing force caused by the compression of the floor contact spring 212 causes the battery edge, which is now disengaged from the locking tab 228, to pop out of the battery compartment 110. The battery 104 pops out in a controlled manner because the opposite edge of the battery is retained under the contact protective tab 226. At this point, the user can grasp the released edge of the battery 104 for removal, disposal, recharging, and/or recycling of the battery 104. A specific technique for inserting, retaining, and removing batteries 104 from the battery retention system 100 will be described in further detail below with reference to FIGS. 4-9.

Figure 4:
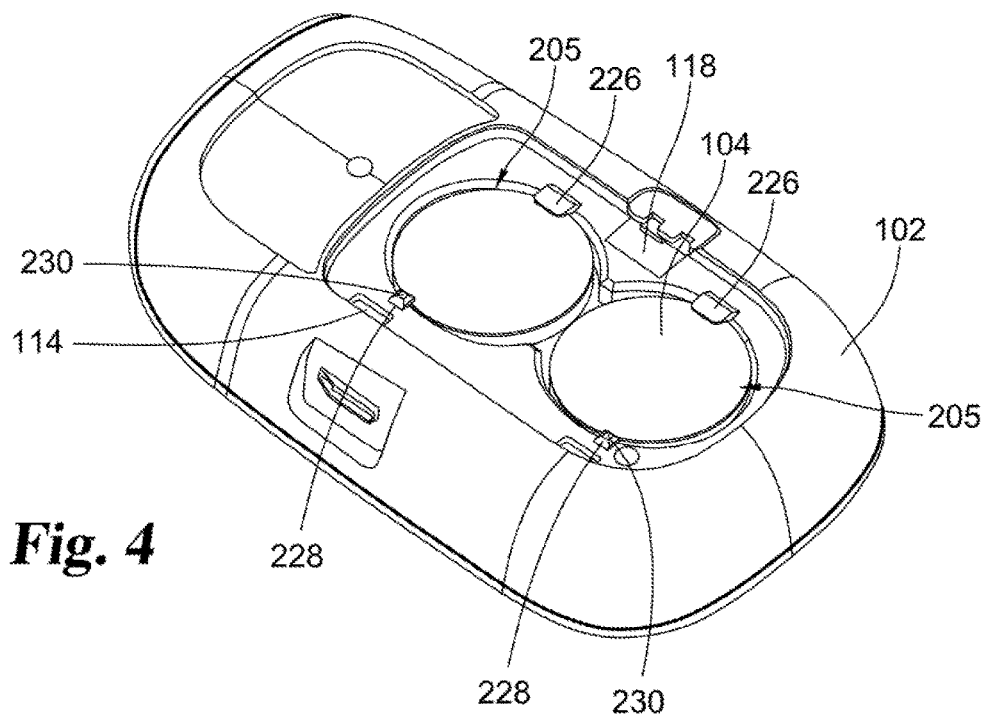
FIG. 4 is a perspective view of the FIG. 2 electronic device with the batteries installed.
Figure 5:
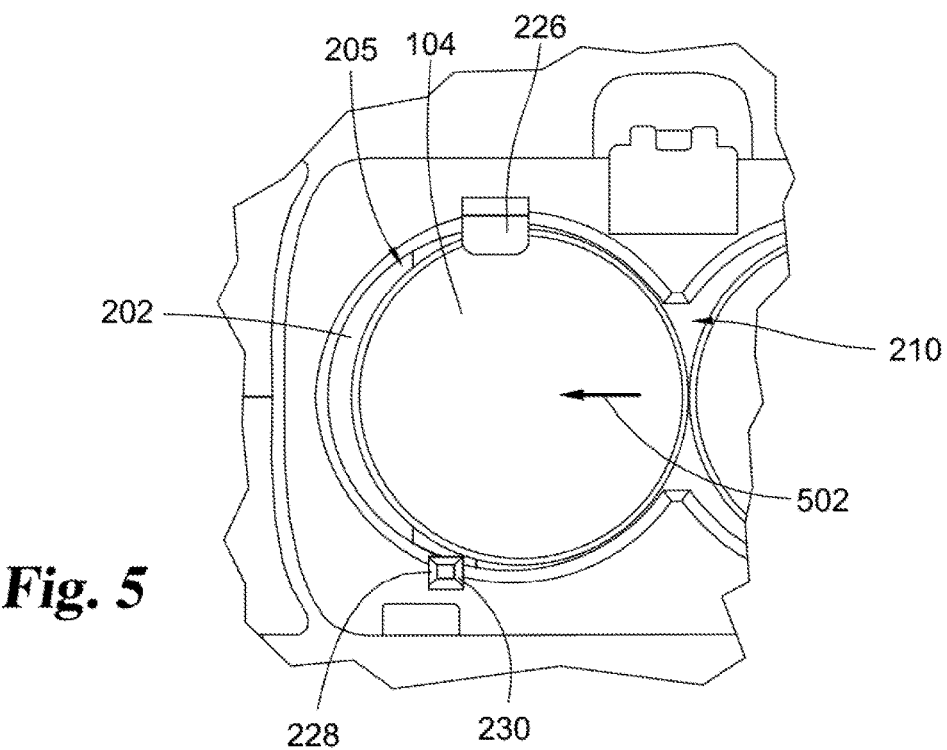
FIG. 5 is an enlarged top view of the battery compartment in the FIG. 2 electronic device during installation of the batteries.

FIG. 4 shows a perspective view of the electronic device 102 when the batteries 104 are installed in the battery cavities 205. As illustrated, the batteries 104 are held in place against the biasing force of the floor contact springs 212 (as shown by arrow 222 in FIG. 2) by the contact protective tabs 226 and the locking tabs 228. Typically, but not always, the batteries 104 are installed into the battery cavities 205 one at a time. During installation of the batteries 104, the edge of each battery 104 is angled so as to be inserted under the contact protective tab 226 in the battery cavities 104. The person installing the battery then pushes the opposite edge of the battery 104 against the biasing force of the floor contact spring 212. Due to the offset location of the locking tab 228 within the cavity 205 (i.e., away from the recess 210), the rounded or beveled exterior 230 of the locking tab 228 causes the battery 104 to slightly move laterally into the recess 210 between the battery cavities 205. During this motion, the wall contact spring 214 becomes compressed as well. Once the battery 104 generally lies flat within the battery compartment floor 202 of the battery cavity 205, the compressed or biased wall contact spring 214 pushes the battery 104 against the opposite battery compartment wall 204 (near the locking tab 228). Due to the rounded shape of the battery 104 and the battery compartment wall 204, the battery 104 is naturally pivoted or moved laterally away from the recess 210 within the cavity 205, as is depicted by arrow 502 in FIG. 5. The battery 104 continues to be pushed in the lateral direction 502 until the opposite edge of the battery 104 is engaged under the locking tab 228. In one form, this lateral movement of the battery 104 occurs solely as a result of the biasing force applied by the wall contact spring 214. In another form, all or part of this lateral motion of the battery 104 is caused by the user pushing or sliding the battery 104 in the lateral direction 502. Once the edge of the battery 104 engages or is hooked under the locking tab 228, the user can remove their finger (or tool) from the battery 104, and the battery 104 is held in place against the biasing force of the floor contact spring 212 by the tabs 226, 228. In addition, the biasing force of the wall contact spring 214 helps to retain the battery 104 in position so as to remain engaged with the locking tab 228.

Figure 6:
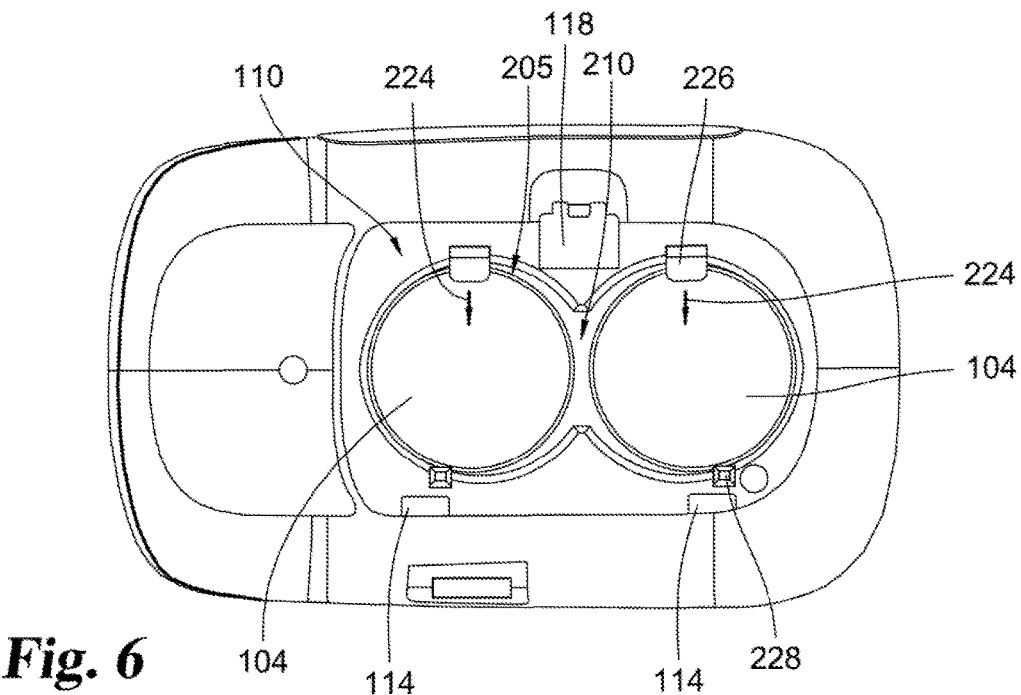
FIG. 6 is a top view of the electronic device with the batteries installed.

Looking at FIG. 6, the other battery 104 is installed in a similar fashion in which the battery 104 is first pushed down into the battery cavity 205 and then pushed laterally away from the recess 210 so as to be secured under the locking tab 228. Both battery cavities 205 share the same recess 210 during battery installation and removal which in turn reduces the profile or size of the battery compartment 110. The lateral biasing force of the wall contact spring 214, as is represented by arrow 224 in FIGS. 2 and 6, helps to ensure the battery 104 remains clipped under the locking tab 228. This push down and lateral slide motion of the battery 104 within the battery cavity 205 can be especially helpful for those with hand dexterity or mobility issues as well as others without such conditions.

Figure 7:
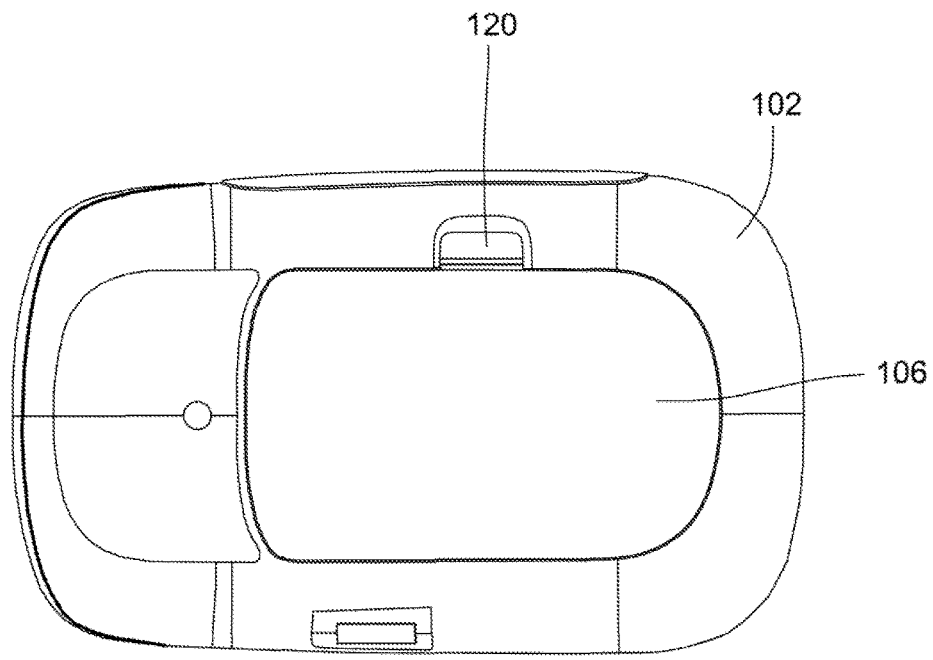
FIG. 7 is a top view of the FIG. 2 electronic device with the door enclosing the battery compartment.
Figure 8:
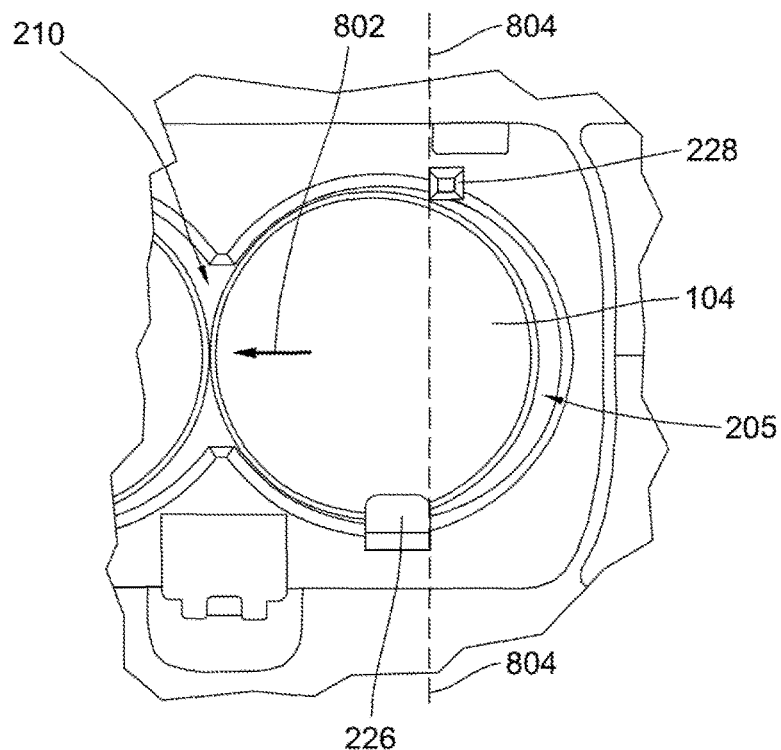
FIG. 8 is an enlarged top view of the battery compartment in the FIG. 2 electronic device during removal of batteries.

Once the batteries 104 are installed in their respective battery cavities 205, the battery door 106 can be installed and closed onto the electronic device 102. As noted before, prior battery door designs required the door to provide sufficient force against the biasing force of the contact spring so as to retain the batteries within the battery cavities. With the illustrated design, since the batteries 104 are already latched under the contact protective tabs 226 and the locking tabs 228, the user does not have to deal with the issue of the batteries 104 popping out of the cavities 205 due to the biasing force of the floor contact springs 212 and/or ensuring that the batteries remain under the door 106 when closed. This configuration also ensures that the contact springs do not have to be oversized so as to compensate for the compression force of the door. To close the battery door 106, the hinge tabs 116 (FIG. 3) are inserted into the hinge cavities 114. The battery door 106 is then pivoted about the hinge tabs 116 so as to close the battery compartment 110. To secure the battery door 106 to the electronic device 102, the door latch 120 is latched to the latch opening 118, as is depicted in FIGS. 6 and 7. As noted before, the door latch 120 as well as the rest of the door 106 does not need to be oversized in order to resist the biasing force of the floor contact springs 212 because the tabs 226, 228 are holding the batteries 104 in place against the biasing force out of the battery cavities 205. With the battery door 106 closed on the electronic device 102, the batteries 104 remain in place and are unable to disengage from the tabs 226, 228 because the door tab 306 is received between the batteries 104 in the recess 210. The door tab 306 prevents any significant lateral movement of the batteries 104 that would cause the batteries 104 to disengage from the locking tab 228.

Figure 9:
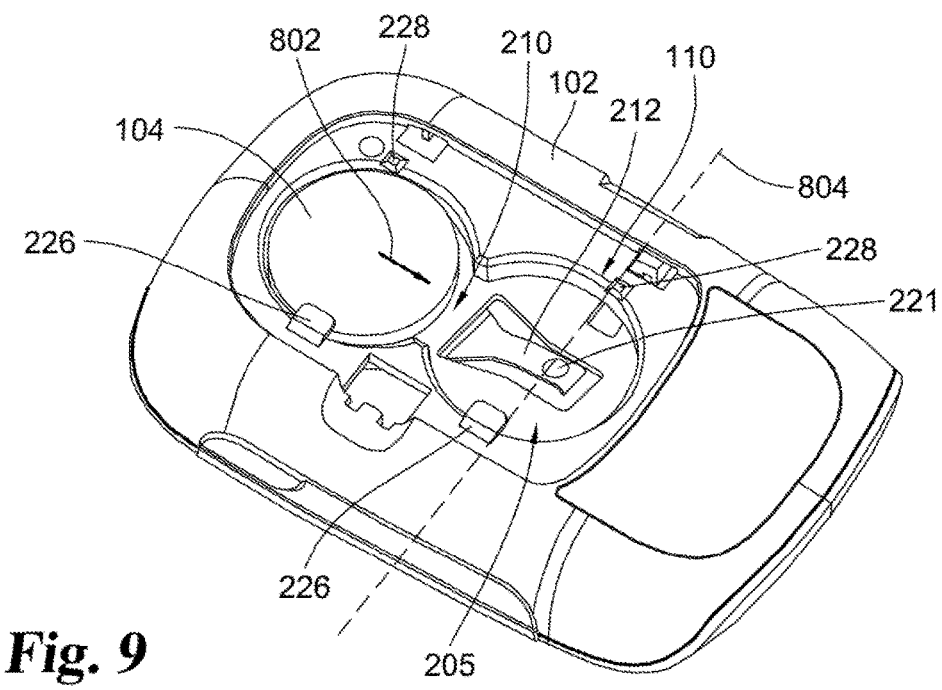
FIG. 9 is a perspective view of the FIG. 2 electronic device with one battery removed.

To remove or replace the batteries 104, the user unlatches the latch 120 and pivots the battery door 106 to an open position. The battery door 106 can then be removed from the electronic device 102, if so desired. With the battery door 106 opened and/or removed, the batteries 104 still remain in place and do not pop out of the battery cavities 205 due to the tabs 226, 228. In order to remove the battery 104, the user slides the battery 104 in a lateral direction towards the recess 210, as is indicated by arrow 802 in FIG. 8. As shown by dashed line 804 in FIGS. 8 and 9, the side edge of the locking tab 228 facing the recess 210 is offset relative to the side edge of the contact protective tab 226 facing away from the recess 210. In other words, the locking tab 228 is positioned farther away from the recess 210 as compared to the contact protective tab 226. As can be seen, the contact portion 221 on the floor contact spring 212 is generally aligned with the locking tab 228 so that the biasing force of the floor contact spring 216 (as shown by arrow 222 in FIG. 2) is generally aligned with the locking tab 228. This configuration reduces the risk of the battery 104 from inadvertently disengaging from the locking tab 228. Once the battery 104 clears the locking tab 228 and pressure from the user's finger (or other appendage/tool) is removed, the edge of the battery 104 proximal to the locking tab 228 pops out of the battery cavity 205 due to the biasing force of the floor contact spring 212 while the opposite edge of the battery 104 generally remains retained under the contact protective tabs 226. As should be recognized, the contact protective tab 226 allows the battery 104 to pop out of the cavity 205 in a predictable and consistent manner. The battery 104 generally remains located at the battery cavity 205. To remove the battery 104, the user grabs the released edge of the battery 104, and afterwards, the user can safely discard the battery 104, if so desired. Removal of the other battery 104 occurs in a similar manner, as is depicted in FIG. 9. Again, the user slides the battery 104 in the lateral direction 802 towards the recess 210 between the battery cavities 205. Once the pressure is relieved and the battery 104 clears the locking tab 228, the battery 104 pops out of the battery cavity 205 as a result of the biasing force of the floor contact spring 212. The user then is able to remove the battery 104 from the battery compartment 110 in a fashion similar to that described before. New batteries 104 can be inserted in the manner as previously described.

Figure 10:
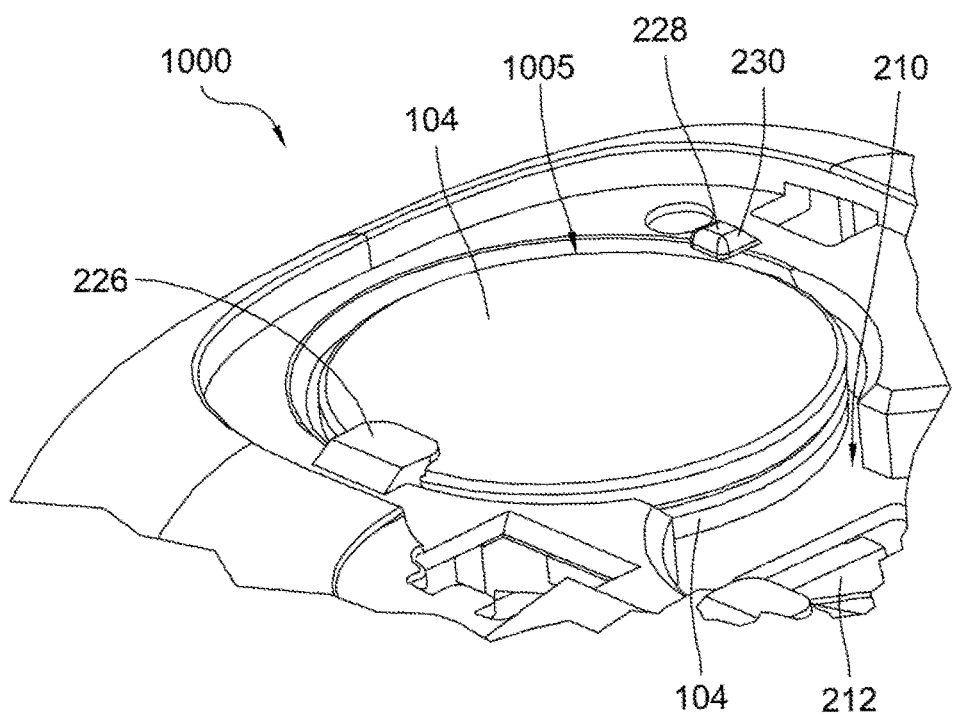
FIG. 10 is an enlarged perspective view of a battery compartment of another example of a battery retention system in which two or more batteries can be installed in the same battery chamber.

This design of the battery retention system 100 allows greater flexibility in the configuration of the batteries 104 as well as the overall design of the electronic device 102. While the cavities 205 hold a single battery 104 in the previously illustrated example, the battery retention system 100 can be configured to hold two or more batteries 104 within a single battery cavity. FIG. 10 illustrates one such battery retention system 1000 that is able to hold two or more batteries 104 within a single battery cavity. Looking at FIG. 10, two batteries 104 are stacked upon one another within a single battery cavity 1005. In this illustrated example, the battery cavity 1005 is deeper than the previously illustrated battery cavities 205 so as to accommodate two batteries 104. Other than that, the battery retention system 1000 is configured the same as the previously described examples. For instance, the battery retention system 1000 in FIG. 10 includes the contact springs 212 (and 214), the recess 210, the contact protective tabs 226, and the locking tab 228 of the type described before. The batteries 104 can be installed and replaced in a similar fashion as described before as well. For example, one of the batteries 104 is inserted into the battery cavity 1005 and placed against the floor contact spring 212. The edge of the second battery 104 is slid under the contact protective tab 226, and the user pushes the battery 104 down against the locking tab 228. Due to the rounded nature of the exterior 230 of the locking tab 228, the battery 104 is guided into the recess 210 between the battery cavities 1005. Once pushed flush against the other battery 104, the user then slides the battery 104 in a lateral direction such that the edge of the battery 104 is slid or clipped under the locking tab 228. Once the edge of the battery 104 is positioned under the locking tab 228, the pressure against the battery 104 can be removed. The door 106 can then be installed on the electronic device 102 in a similar fashion as described before. Once the batteries 104 are used and/or need to be replaced, the batteries 104 can be removed in an opposite manner, that is, the top battery 104 is slid laterally towards the recess 210 until the battery 104 is able to pop up by disengaging from the locking tab 228 in a similar manner to the previously described examples. Once the battery is disengaged from the locking tabs 228, both batteries 104 can be removed from the battery cavity 1005.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A system, comprising:
a housing defining a battery cavity configured to receive a battery, the battery cavity having a floor and a wall configured to extend around an edge of the battery when received in the battery cavity;
the wall of the battery cavity having a recess that allows the battery to move in a lateral direction along the floor of the cavity during insertion and removal of the battery;
a floor contact spring extending from the floor, wherein the floor contact spring is configured to provide a floor contact spring biasing force that is transverse to the floor to push the battery away from the floor of the battery cavity, wherein the floor contact spring includes a contact portion where the floor contact spring contacts the battery;
a wall contact spring extending from the wall of the battery cavity to apply a wall contact spring biasing force against the edge of the battery that is transverse to the wall;
a contact protective tab positioned to cover the wall contact spring, wherein the contact protective tab extends into the battery cavity to retain the battery;
a locking tab positioned along a side of the battery cavity with the floor contact located between the contact protective tab and the locking tab;
wherein the locking tab is aligned with the contact portion of the floor contact spring to counteract the floor contact spring biasing force from the floor contact spring;
wherein the contact protective tab and the locking tab are positioned on opposing sides of the battery cavity that are transverse to the lateral direction of the recess;
wherein the locking tab is located offset from the contact protective tab at a position away from the recess in the wall of the battery cavity; and
wherein the floor contact spring biasing force and the wall contact spring biasing force are offset from one another to create a torque on the battery that rotates the battery about the contact portion of the floor contact spring where the battery is able to remain clipped to the locking tab when received in the battery cavity.

2. The system of claim 1, wherein the locking tab has a beveled exterior surface to guide the battery into the battery cavity.

3. The system of claim 1, further comprising:
a battery door enclosing the battery cavity; and
the battery door defining a contact protective tab cavity in which the contact protective tab is received and a locking tab cavity in which the locking tab is received.

4. The system of claim 1, further comprising:
a battery door configured to cover the battery cavity when in a closed position; and
wherein the contact protective tab and the locking tab are configured to retain the battery in the battery cavity without the battery door needing to be in the closed position.

5. The system of claim 4, wherein the battery door includes a door tab extending into the recess to reduce lateral movement of the battery within the battery cavity.

6. The system of claim 4, wherein the battery door includes one or more cavities to configured receive the contact protective tab and the locking tab.

7. The system of claim 1, wherein the floor contact spring has the contact portion angled away from the recess to facilitate lateral movement of the battery away from the recess during insertion of the battery into the battery cavity.

8. The system of claim 1, wherein:
the housing defines a second battery cavity configured to receive a second battery; and
the battery cavity and the second battery cavity overlap to share the recess.

9. The system of claim 8, further comprising:
wherein the housing defines a battery compartment that includes the battery cavity and the second battery cavity; and
a battery door configured to enclose the battery compartment, the battery door having a door tab positioned to extend into the recess between the battery compartment and the second battery cavity when closed.

10. The system of claim 1, further comprising:
the battery received in the battery cavity; and
a second battery stacked on the battery in the battery cavity.

11. A system, comprising:
a housing defining a battery cavity configured to receive a battery, the battery cavity having a floor;
a floor contact extending from the floor, wherein the floor contact is configured to provide a biasing force to push the battery away from the floor of the battery cavity;
the housing having one or more tabs extending into the battery cavity to hold the battery in the battery cavity against the biasing force of the floor contact;

the battery cavity having a recess that allows the battery to move in a lateral direction along the floor to a position where the battery disengages from at least one of the tabs to allow at least a portion of the battery to be pushed out of the battery cavity by the biasing force of the floor contact;

a battery door configured to cover the battery cavity when in a closed position;

wherein the tabs are configured to retain the battery in the battery cavity without the battery door needing to be in the closed position; and wherein the battery door includes a door tab extending into the recess to reduce lateral movement of the battery within the battery cavity.

12. The system of claim 11, further comprising:
a wall contact positioned in the battery cavity to bias the battery to engage at least one of the tabs.

13. The system of claim 12, wherein:
the tabs include
   a contact protective tab positioned to protect the wall contact, and
   a locking tab positioned along a side of the battery cavity with the floor contact located between the contact protective tab and the locking tab; and
the wall contact is configured to bias the battery to engage the locking tab.

14. The system of claim 13, wherein the locking tab has a beveled exterior surface to guide the battery into the battery cavity.

15. The system of claim 13, wherein the battery door defines a contact protective tab cavity in which the contact protective tab is received and a locking tab cavity in which the locking tab is received.

16. The system of claim 13, wherein:
the floor contact includes a contact portion where the floor contact contacts the battery;
the locking tab is located offset from the contact protective tab; and
the locking tab is aligned with the contact portion to counteract the biasing force from the floor contact.

17. The system of claim 11, wherein the battery door includes one or more cavities configured to receive the tabs.

18. The system of claim 11, wherein the floor contact has a contact portion that is angled away from the recess to facilitate lateral movement of the battery away from the recess during insertion of the battery into the battery cavity.

19. The system of claim 11, further comprising:
the battery received in the battery cavity; and
a second battery stacked on the battery in the battery cavity.

20. A system, comprising:
a housing defining a battery cavity configured to receive a battery, the battery cavity having a floor;

a floor contact extending from the floor, wherein the floor contact is configured to provide a biasing force to push the battery away from the floor of the battery cavity;

the housing having one or more tabs extending into the battery cavity to hold the battery in the battery cavity against the biasing force of the floor contact;

the battery cavity having a recess that allows the battery to move in a lateral direction along the floor to a position where the battery disengages from at least one of the tabs to allow at least a portion of the battery to be pushed out of the battery cavity by the biasing force of the floor contact;

wherein the housing defines a second battery cavity configured to receive a second battery;

wherein the battery cavity and the second battery cavity overlap to share the recess;

wherein the housing defines a battery compartment that includes the battery cavity and the second battery cavity; and a battery door configured to enclose the battery compartment, the battery door having a door tab positioned to extend into the recess between the battery compartment and the second battery cavity when closed.

21. The system of claim 20, further comprising:
a wall contact positioned in the battery cavity to bias the battery to engage at least one of the tabs.

22. The system of claim 21, wherein:
the tabs include
   a contact protective tab positioned to protect the wall contact, and
   a locking tab positioned along a side of the battery cavity with the floor contact located between the contact protective tab and the locking tab; and
the wall contact is configured to bias the battery to engage the locking tab.

23. The system of claim 22, wherein:
the floor contact includes a contact portion where the floor contact contacts the battery;
the locking tab is located offset from the contact protective tab; and
the locking tab is aligned with the contact portion to counteract the biasing force from the floor contact.

24. The system of claim 22, wherein the locking tab has a beveled exterior surface to guide the battery into the battery cavity.

25. The system of claim 20, wherein the battery door includes one or more cavities configured to receive the tabs.

26. The system of claim 20, wherein the floor contact has a contact portion that is angled away from the recess to facilitate lateral movement of the battery away from the recess during insertion of the battery into the battery cavity.

* * * * *